US007686735B2

(12) United States Patent
Vornehm et al.

(10) Patent No.: US 7,686,735 B2
(45) Date of Patent: Mar. 30, 2010

(54) CONTINUOUSLY VARIABLE POWER-BRANCHED TRANSMISSION, AND A METHOD FOR REGULATING A CONTINUOUSLY VARIABLE POWER-BRANCHED TRANSMISSION

(75) Inventors: Martin Vornehm, Wooster, OH (US); Emmanuel Simon, Herrlisheim (DE)

(73) Assignee: LuK Lamellen und Kupplungsbau Betelligungs KG, Bühl (DE)

( * ) Notice: Subject to any disclaimer, the term of this patent is extended or adjusted under 35 U.S.C. 154(b) by 363 days.

(21) Appl. No.: 11/788,378

(22) Filed: Apr. 19, 2007

(65) Prior Publication Data

US 2007/0254770 A1 Nov. 1, 2007

Related U.S. Application Data

(60) Provisional application No. 60/793,310, filed on Apr. 19, 2006.

(51) Int. Cl.
*F16H 61/66* (2006.01)
(52) U.S. Cl. .......................................... 477/46; 477/44
(58) Field of Classification Search ............... 477/37, 477/44, 46, 115
See application file for complete search history.

(56) References Cited

U.S. PATENT DOCUMENTS

2005/0056513 A1 3/2005 Reuschel ................ 192/3.58

2005/0227809 A1 10/2005 Bitzer et al. ............... 477/37

FOREIGN PATENT DOCUMENTS

| DE | 199 03 554 A1 | 8/2000 |
| DE | 101 23 026 A1 | 11/2002 |
| DE | 103 02 992 A1 | 10/2003 |
| DE | 10 2004 007 103 A1 | 9/2004 |
| WO | WO 2005/047738 A1 | 5/2005 |

*Primary Examiner*—Ha D. Ho
(74) *Attorney, Agent, or Firm*—Alfred J. Mangels

(57) ABSTRACT

A continuously variable power-branched transmission for a motor vehicle, including an input shaft, a variable speed drive unit having pairs of conical disks and a continuously variable transmission ratio, a gear system, and an output shaft. Two control clutches connect the variable speed drive unit and the gear system so that when going through the entire transmission ratio range of the power-branched transmission the adjustment range of the variable speed drive unit is passed through a plurality of times. The transmission also includes rotational speed sensors and a controller that determines whether a change in rotational speed is triggered by a change in the transmission ratio, and when it is not triggered by a change in the transmission ratio, the controller adjusts the variable speed drive unit so that the change in rotational speed not triggered by a change in the transmission ratio is compensated.

19 Claims, 3 Drawing Sheets

CONTINUOUSLY VARIABLE POWER-BRANCHED TRANSMISSION, AND A METHOD FOR REGULATING A CONTINUOUSLY VARIABLE POWER-BRANCHED TRANSMISSION

BACKGROUND OF THE INVENTION

1. Field of the Invention

The present invention relates to a continuously variable power-branched transmission that can be operated at least partially, i.e., temporarily, in a power-branching operational mode. The present invention also relates to a method for operating such a transmission.

2. Description of the Related Art

Transmissions with continuously variable transmission ratio (CVT transmissions) are being used increasingly in vehicles, in particular in passenger cars, because of their convenience and the possible reduction of fuel consumption in comparison to stepped automatic transmissions that operate exclusively with planetary gear trains. Power is transmitted in such continuously variable transmissions by an endless torque-transmitting means that circulates between two pairs of conical disks, where an effective radius of each conical disk pair is variable by changing the spacing between the conical disks of a conical disk pair from each other. Therefore, in general a clamping pressure that is dependent on the torque being transmitted at the moment is produced by means of pressure pistons. Either a hydromechanical torque sensor is provided for that purpose or the clamping pressure is controlled freely by software. A combination of the two possibilities is also known from DE 103 02 992 A1. The clamping pressure increases principally with the detected torque, and depends exclusively on the transmission ratio. When the transmission ratio is to be changed, the torque-related pressure is superimposed with an adjusting pressure, by means of which the transmission ratio is changed.

For reasons of fuel consumption reduction, it is desirable to increase the spread of a transmission beyond the value that is possible with a single CVT transmission. That is achieved with so-called power-branched transmissions, in which the spread or transmission ratio range of a CVT transmission is utilized "twice," in that the transmission ratio range of the CVT transmission is passed through twice over its entire spread range when changing the total transmission ratio of the power-branched transmission, for example in the opposite direction, by combining it with a system of gears and activating corresponding control links.

FIGS. 1 and 2 show an example of a power-branched transmission that is known per se and can be utilized in connection with the present invention.

An example of a drive engine of a vehicle is an internal combustion engine 2, which is connected through a start-up clutch 4 to an input shaft 6 of a power-branched transmission 8, whose output shaft is indicated by 10. The power-branched transmission 8 includes a variable speed drive unit 12 having a continuously variable transmission ratio, and at least one gear system 14, for example a planetary gear train, as well as at least two control clutches K1 and K2, whereby the variable speed drive unit 12 can be linked with the gear system 14 in various ways. Inputs of an electronic control and regulating device 16 are connected to an accelerator pedal sensor 18, a power control setting sensor 20 of the internal combustion engine 2, an engine speed sensor 22, a sensor 24 for an input shaft of variable speed drive unit 12, which can simultaneously be input shaft 6, a sensor 26 for detecting the speed of rotation of the output shaft of variable speed drive unit 12, a sensor 28 for detecting the speed of rotation of drive shaft 10, and possibly additional sensors. In the electronic control and regulating device 16, output signals are produced depending upon the signals from the various sensors and upon algorithms, performance data, etc., that are stored in the control and regulating device 16. A power setting element 30 of internal combustion engine 2, an actuator for start-up clutch 4, the torque-dependent pressure in pressure cylinders for the pairs of conical disks of variable speed drive unit 12, the pressures in adjusting cylinders for the conical disk pairs 12 for changing the transmission ratio of the latter, and control clutches K1 and K2 are controlled by the output signals. The figures do not show gear sets of the vehicle, on which rotational speed sensors can also be provided, as well as a clutch and/or a brake for reverse travel.

FIG. 2 shows an example of a power-branched transmission having a variable speed drive unit 12, one conical disk pair 30 of which one disk is connected to input shaft 6 with a rotationally fixed connection and can be coupled to a first gear 32 by means of a first control clutch K1. The other conical disk pair 34 of variable speed drive unit 12 is connected with a rotationally fixed connection to an output shaft 36, which in turn is connected with a rotationally fixed connection to the sun gear 37 of a gear system 14 in the form of a planetary gear train. The output shaft 36 can be coupled additionally through a second control clutch K2 to a second gear 38, which is rotationally engaged with first gear 32 through an intermediate gear 40. Second gear 38 is connected in a rotationally fixed connection to planet carrier 42 of the planetary gear train, whose planet gears 44 mesh with internal gear 46, which is connected to output shaft 10 in a rotationally fixed connection. When control clutch K2 is engaged and control clutch K1 is disengaged, sun gear 37 and planet carrier 42 rotate together, so that the planet gears 44 stand still and take internal gear 46 with them. The entire power-branched transmission then works like a simple CVT transmission, whose total transmission ratio is effectively doubled. At a shift point at which the transmission ratio of the variable speed drive unit has a small, predetermined value the control clutches K1 and K2 are reversed, so that the planet carrier 42 now turns with the transmission ratio corresponding to the transmission ratio that exists between the first gear 32, which is connected to input shaft 6 in a rotationally fixed connection, the intermediate gear 40, and the second gear 38, and the planetary gear system 14 becomes operative. The transmission ratios are chosen so that at a shift point U the total transmission ratio $i_{total}$ of the power-branched transmission is independent of the shift state of control clutches K1 and K2. If the spread range of the variable speed drive unit 12 is passed through again with the control clutches K1 and K2 in that shift state, the transmission ratio $i_{total}$ changes again.

Of course, it is also possible to design the transmission ranges so that the reversal is combined with a reduction of rotational speed caused by friction clutches. It is likewise possible to design the transmission ranges so that the reversal is combined with a change in the variable speed drive unit transmission ratio.

FIGS. 3, 4, 5 and 6 show examples of arrangements of power-branched CVT transmissions with various options for installing a torque detection means, for example a hydromechanical torque sensor or an electronic measuring device. If a hydromechanical torque sensor is used, it outputs a clamping pressure that corresponds to the conveyed torque. If an electronic measuring device is used instead, an electronic torque signal is delivered to the controller. Depending upon that torque, the movable conical disk of a disk pair is thus pressed toward the fixed disk to set the effective radius of the conical disk pair.

In FIGS. 3 through 6, $J_{engine}$, $J_{input}$, $J_{SS1}$, and $J_{SS2}$, respectively, show schematically the moments of inertia corresponding to the engine shaft, the input shaft, and the variable speed drive unit shafts.

Reference numeral 50 designates the torque detection means, which either outputs clamping pressure directly, depending upon the torque, or it generates a corresponding signal as the input signal to the controller. FIGS. 3 through 6 show various non-limiting possibilities for power branching.

In such known power-branched continuously variable transmissions, the clamping force that is exerted on the conical disk pairs increases and decreases with the torque, and depends upon the transmission ratio.

Starting from that background, an object of the invention is to develop a further refinement of a continuously variable power-branched transmission, in particular for a motor vehicle, in such a way that wheel-side torques can be compensated for.

SUMMARY OF THE INVENTION

The object is achieved with a continuously variable, power-branched transmission and a method for regulating a continuously variable, power-branched transmission, each as hereinafter described.

In accordance with the invention a controller for the transmission is adapted so that it analyzes wheel-side torques, which are manifested in a change of rotational speed, and, in consideration of the fact that the torques introduced from the output side of the transmission are also branched in the power-branched transmission, uses them to determine a newly requisite clamping force for the conical disks due to the change, and finally orders the application of that clamping force to the conical disks.

In accordance with the invention torque impulses in a power-branched transmission structure act on the power-branched CVT transmission structure in such a way that impact torques also branch, but that their distribution does not necessarily correspond to the distribution of the engine-side input torque. Instead, in such situations—depending upon the transmission ratio and the transmission structure—the torque impulse perceivable in a power path, which usually determines the clamping path, can differ significantly in value and possibly in arithmetical sign from the torque impulse which a CVT located in the same power path must actually transmit to ensure an adequate and appropriate clamping force. That means that the torque sensor function does not deliver reliable results.

In accordance with the invention, the controller of the continuously variable power-branched transmission is modified in such a way that it makes a differentiation between whether the change in speed of rotation is triggered exclusively by a change in the transmission ratio. In the event of a change that is not triggered or not exclusively triggered by a change in the transmission ratio, the controller changes the axial force of the means for producing the axial force that supplies the clamping force, in order to compensate for the change in the speed of rotation that is not triggered by a change in the transmission ratio.

In accordance with a preferred embodiment, the torque is detected by means of a hydromechanical torque sensor, or another type of torque sensor. When a hydromechanical torque sensor is used it produces a pressure proportional to the conveyed torque.

The means for detecting the torque preferably produces a signal in electrical or hydraulic form, which is passed to the controller.

If a torque-detecting means is provided, when a change in rotational speed occurs, based upon the detected torque, in accordance with a preferred embodiment of the invention the controller carries out the steps of calculating for a plurality of shafts provided in the transmission the torques that are absorbed or delivered by the change in rotational speed, using their rotating masses (moments of inertia) and their transmission-ratio-dependent connection to the points where the speed of rotation is measured; it calculates the contribution of torque conducted through the variable speed drive unit due to the change in rotational speed and the resulting necessary contribution of clamping force; it calculates the contribution of torque passing through the torque detection means due to the change in rotational speed and the contribution of clamping force produced as a result; and it finally calculates—on the basis of the differences between the needed and the produced contribution of clamping force—the situation-dependent additional or reduced pressure of the means for producing an axial force, normally hydraulic pressure.

Preferably, rotational speed signals from speed sensors provided in the transmission determine the transmission ratio of the variable speed drive unit.

In accordance with a preferred embodiment, the transmission ratio of the entire transmission, for example, can be used. Alternatively, or in addition, the shift state of the at least two control clutches of the continuously variable, power-branched transmission can be taken into account. The change in speed of rotation can also be provided, for example, on the basis of the rotational speeds of the vehicle wheels, which are detected by appropriate rotational speed sensors provided on the wheels.

The torques or axial forces can be determined by calculating them from other measured variables in the transmission or by reading corresponding sensors, depending upon the configuration chosen.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

The construction of a CVT transmission in accordance with the invention and that serves as an example of a continuously variable transmission that is power-branched at least part of the time, the input power of which is transmitted with branching at least part of the time, i.e., when clutches are positioned appropriately so that the endless torque-transmitting means converts only part of the input power when the power is branched, corresponds to the construction described above in connection with FIGS. 1 through 6, and therefore will not be repeated. The controller of the power-branched CVT transmission is appropriately adapted to carry out the necessary regulating procedures, so as to respond to dynamic driving situations, i.e., those in which torques are introduced into the transmission from the output side, and to change the clamping pressure depending upon those torques.

Figure 1:
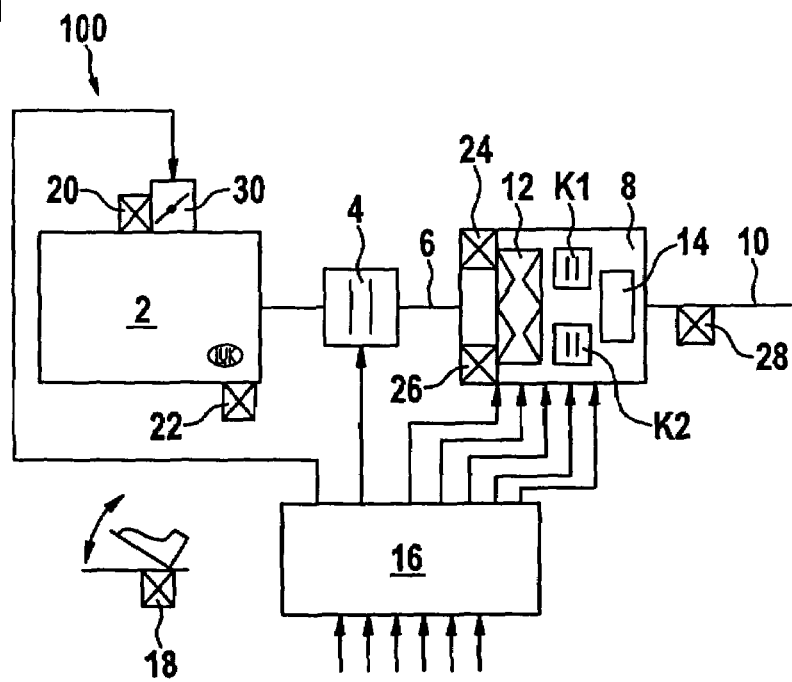
FIG. 1 is a schematic representation of a motor vehicle power train including a power-branched CVT transmission.
Figure 2:
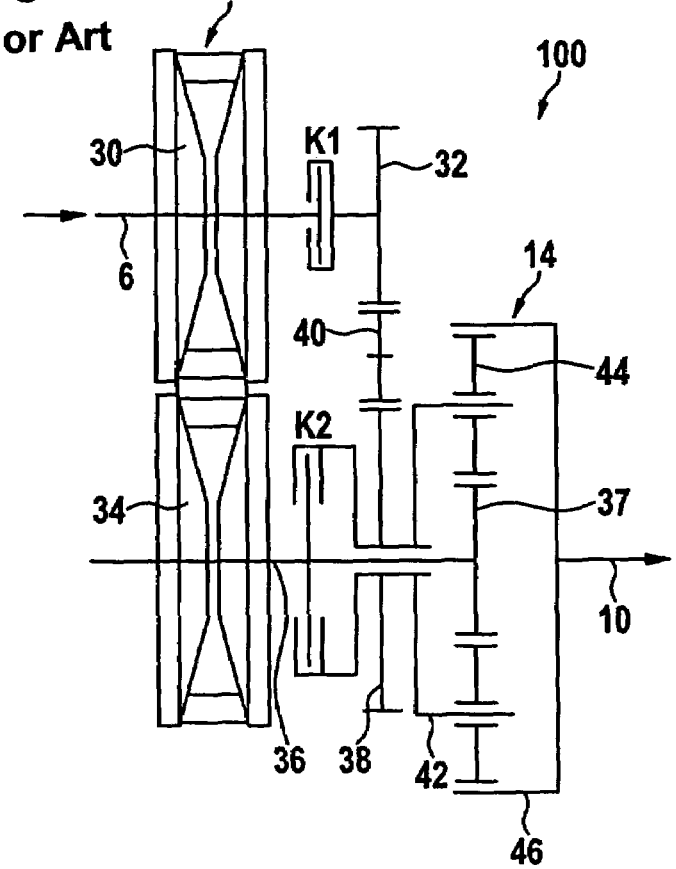
FIG. 2 is a schematic longitudinal view of an embodiment of a power-branched CVT transmission.
Figure 3:
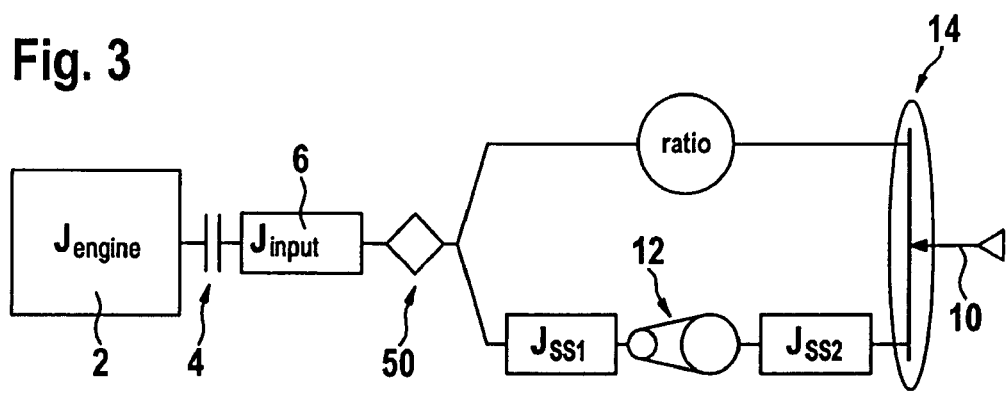
FIG. 3 is a schematic view showing an example of a power-branched CVT transmission with one possible installation position of a torque-determining means.
Figure 4:
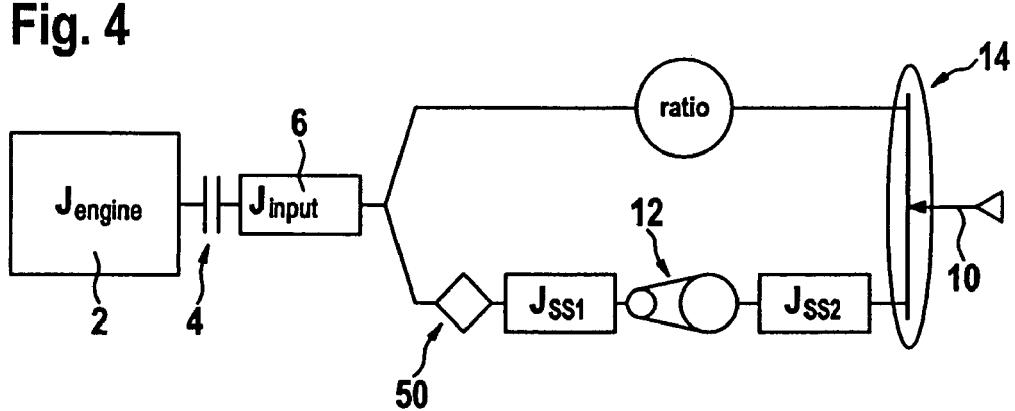
FIG. 4 is a schematic view similar to FIG. 3, wherein another possible position is shown for the torque-determining means.
Figure 5:
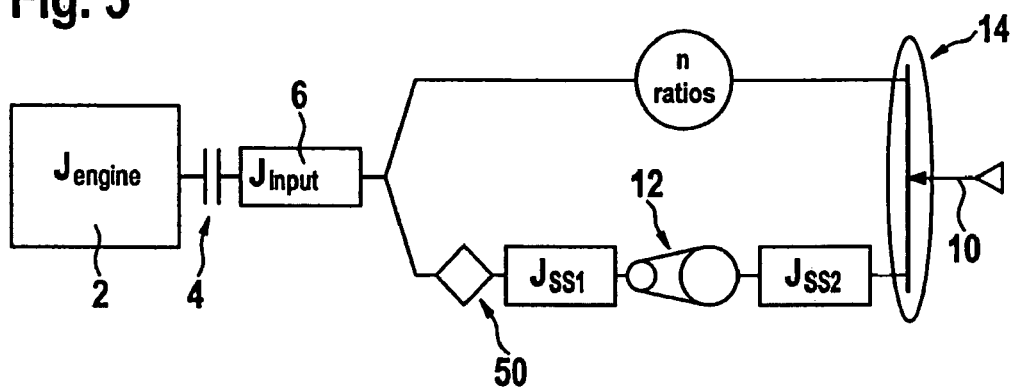
FIG. 5 is a schematic view of a further example of a power-branched CVT transmission.
Figure 6:
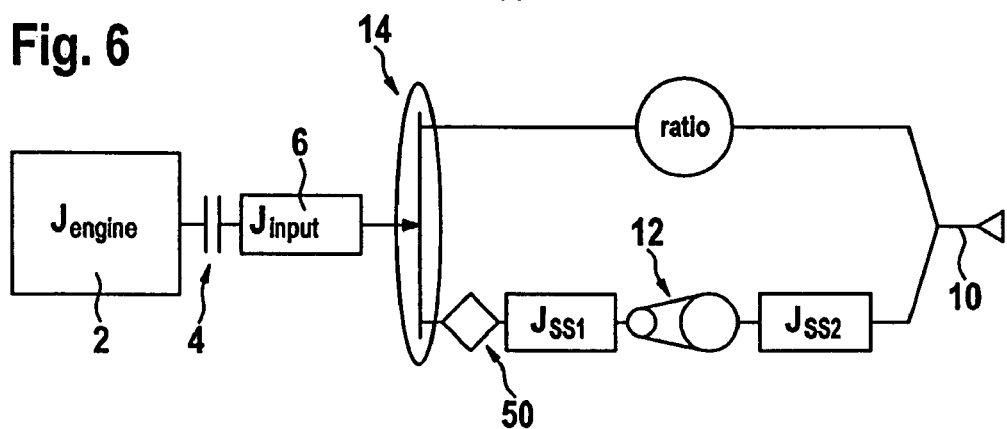
FIG. 6 is a schematic view of another example of a power-branched CVT transmission.
Figure 7:
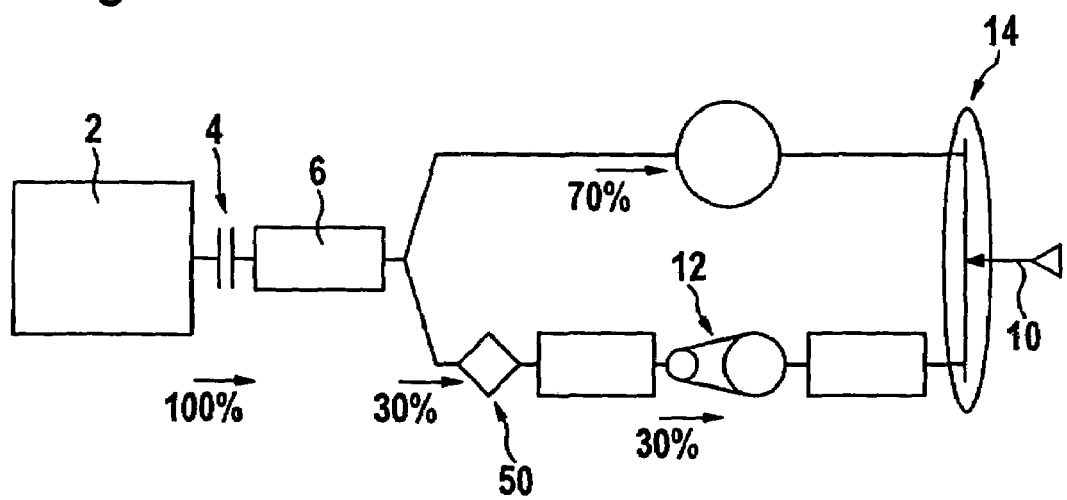
FIG. 7 is a schematic view in a static situation of a power-branching system for the power-branched CVT transmission shown in FIG. 4.

FIG. 7 shows the distribution of the torque from the engine 2 in static situations. 100% of the power output of engine 2 passes through clutch 4 and is introduced into the transmission via input shaft 6 (inertial mass $J_{input}$) and is split there in the proportions 70 to 30, for example (see FIG. 7). The ratio of the division depends upon the transmission ratio at which the power-branched transmission is currently being operated. That means that 30% of the torque being output by engine 2 is also detected at torque-detecting means 50, for example a torque sensor. Likewise, 30% flows through variable speed drive unit 12 and the variable speed drive unit output shaft into planetary gear train 14. From there, the entire engine power (100% of the engine torque) is again transmitted via the output shaft 10 to the wheels of the vehicle.

Figure 8:
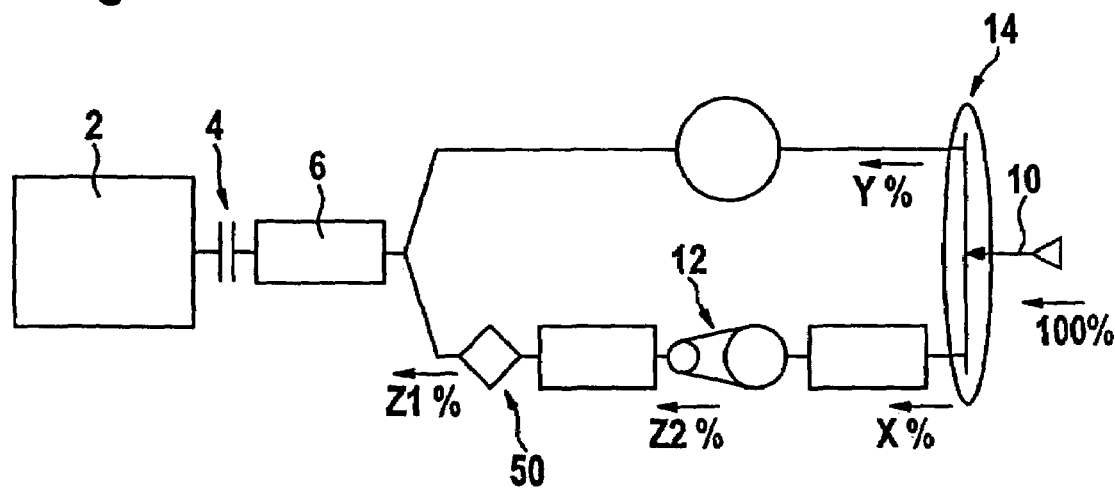
FIG. 8 is a schematic view in a dynamic situation, beginning at startup, of the power-branching system for the transmission in FIG. 7.

If a peak transient torque of 100% is instead introduced from the wheel side, i.e., via the output shaft 10, as shown in FIG. 8, it is divided into torques of X % and Y % (X %+Y %=100%) depending upon the transmission ratio of the planetary gear train 14 and the rotation masses (moments of inertia J) of the involved shafts. The rotating masses (moments of inertia of the shafts) are accelerated by those torques, so that in the lower line, as shown in FIG. 8, the torque or power decreases in the direction to the left, i.e., through the variable speed drive unit 12 and the variable speed drive unit input shaft to the torque sensor 50. Of X % different torques or power outputs, that results in Z1% and Z2% at the torque sensor 50 and variable speed drive unit 12, respectively. Thereby, due to the distribution of rotating masses, it is even possible for Z1 to become not only smaller but even negative at torque sensor 50, if relatively little power flows in that path that includes variable speed drive unit 12.

On the other hand, FIG. 8 shows that the torque measured at the torque sensor 50, i.e., the torque measured at position Z1, which determines the pressure for the torque Z2 at the variable speed drive unit 12, does not correspond to the torque Z2 at the variable speed drive unit, and hence that the clamping force for variable speed drive unit 12 determined at torque sensor 50 can diverge from the clamping force actually required at variable speed drive unit 12, due to the torque impulse from the output side, so that a correction is necessary.

Therefore, in accordance with a preferred embodiment, when a change in speed of rotation is detected at the transmission shafts, the torques that are freed or absorbed through the change of rotational speed at the shafts are calculated in the controller, with the determination being made using the transmission ratio, i.e., the speed of rotation of the shafts, and the rotating masses. At a known transmission ratio and known rotating masses of the shafts and of rotating components provided on them, it is possible to determine the absorbed or delivered torque of a plurality of shafts from a change of rotational speed of one shaft.

Subsequently, the contribution of the torque flowing through the variable speed drive unit due to the change in speed of rotation is determined in the controller, i.e., the contribution of torque that corresponds to Z2 in FIG. 8. The necessary clamping force contribution is determined from that torque contribution in a known manner in the controller.

In the same way, simultaneously with the determination of the torque at the variable speed drive unit or of the torque contribution that comes about through the change in speed of rotation, a determination is made at the torque detection means 50, i.e., the torque contribution Z1. Also determined from the torque contribution Z1 is a clamping force or a clamping force contribution, which corresponds to the clamping force contribution actually provided and produced on the basis of the torque detection.

Finally, the controller calculates the difference between the necessary clamping force and the clamping force contribution being produced, and corrects the pressure which the means of producing an axial force applies to the conical disks, in such a way that the difference between the calculated necessary clamping force contribution and the calculated clamping force contribution being produced decreases.

In addition to the normal hydraulic pressures calculated in a known manner, which produce the adjusting and clamping forces at the variable speed drive unit, the controller must then also supply the additional clamping forces or reduced clamping forces produced by the dynamic torques. The usual change of the variable speed drive unit clamping forces is determined from the torque calculated from torque sensor 50 and the produced clamping force derived therefrom, making allowance for a measured or calculated rotational speed ratio of the variable speed drive unit, from which the torque transmitted by the chain is determined.

In accordance with the invention, the calculation of the additional adjusting force or the reduced adjusting force due to the dynamic torques includes the actual transmission ratio of the variable speed drive unit 12, which is determinable, for example, from rotational speed signals at the variable speed drive unit input shaft and the variable speed drive unit output shaft. Appropriate rotational speed sensors can be provided for that purpose. Likewise, when calculating the transmission ratio of the transmission, the state of the clutches K1, K2 is taken into account, along with the shift state of the transmission as a whole. The rotational speed change that triggers the calculation of the additional or reduced forces to be applied to the variable speed drive unit, can occur, for example, by detecting a change in speed of rotation at wheel sensors of the vehicle.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A continuously variable power-branched transmission for a motor vehicle, said transmission comprising: an input shaft drivable by an engine to provide an input torque; a variable speed drive unit operatively connected with the input shaft and having a continuously variable transmission ratio and including two pairs of axially opposed conical disks wherein a spacing between the disks of a disk pair is axially adjustable; a gear train operatively coupled with the variable speed drive unit and including an output shaft; at least two control clutches for connecting shafts of the variable speed drive unit with the gear train so that when going through the entire transmission ratio range of the power-branched transmission an adjustment range of the variable speed drive unit is passed through a plurality of times; axial force producing means for producing an axial force to reposition one conical disk of a conical disk pair of the variable speed drive unit to adjust the transmission ratio of the variable speed drive unit; means for detecting a change in rotational speed of respective shafts; and a controller operatively connected with the transmission and adapted to make a differentiation as to whether a change in rotational speeds of the shafts is triggered by a change in the transmission ratio, and when the rotational speed change is not triggered by the change in the transmission ratio, to change an axial force imposed by the axial force producing means to compensate for the change in rotational speed that is not triggered by a change in the transmission ratio.

2. A transmission in accordance with claim 1, including torque detection means for detecting an input torque to the transmission.

3. A transmission in accordance with claim 2, wherein the controller is adapted to make a judgment as to whether a change in rotational speed ratio is triggered by the change in the transmission ratio by means of a torque that is detected by the torque detection means.

4. A transmission in accordance with claim 2, wherein the torque detection means is adapted to transmit a torque signal to the controller in one of electrical and hydraulic form.

5. A transmission in accordance with claim 2, wherein the controller carries out the following steps when the change in rotational speed is detected:
　a) determining the torques of active shafts of the power-branched transmission using the current transmission ratio of the transmission and shaft inertial masses;
　b) determining a torque conducted through the variable speed drive unit;
　c) determining a necessary axial force of the axial force producing means from the torque conducted through the variable speed drive unit;
　d) determining the torque conducted through the torque detection means;
　e) determining a produced axial force from the torque contribution determined in step (d);
　f) calculating the difference between the necessary axial force and the produced axial force; and
　g) ordering a change in axial force of the axial force producing means so that the difference calculated in step (f) decreases.

6. A transmission in accordance with claim 5, wherein the transmission includes a plurality of rotational speed sensors, and a determination is carried out in at least one of the steps a) through e) based upon rotational speed signals from the rotational speed sensors to determine the transmission ratio of the variable speed drive unit.

7. A transmission in accordance with claim 5, wherein in at least one of the steps a) through e) the transmission ratio of the overall transmission is utilized by the controller.

8. A transmission in accordance with claim 5, wherein in at least one of the steps a) through e) shift states of the at least two control clutches are conveyed to the controller.

9. A transmission in accordance with claim 5, including a rotational speed sensor for detecting rotational speed of the vehicle wheels, and wherein in at least one of the steps a) through e) a change in the rotational speed of the vehicle wheels detected by the rotational speed sensors for the rotational speeds of the vehicle wheels is conveyed to the controller.

10. A method for regulating a continuously variable power-branched transmission for a motor vehicle, wherein the transmission includes an input shaft drivable by an engine, a variable speed drive unit with continuously variable transmission ratio, a gear system operatively connected with the variable speed drive unit and having an output shaft, at least two control clutches for connecting the variable speed drive unit and the gear system to each other so that when proceeding through the entire transmission ratio range of the power-branched transmission an adjustment range of the variable speed drive unit is passed through a plurality of times, axial force producing means for producing an axial force to reposition one conical disk of a conical disk pair to adjust the transmission ratio of the variable speed drive unit, means for detecting a change in rotational speed of a shaft, and a controller, said method comprising the steps of:
　detecting a change in rotational speed of a shaft;
　determining whether the change in rotational speed is triggered by the change in the transmission ratio; and
　if the change in speed of rotation is not triggered entirely by the change in the transmission ratio, changing an axial force applied to the one conical disk by the axial force producing means to compensate for the change in rotational speed that is not triggered by a change in the transmission ratio.

11. A method in accordance with claim 10, including the step of detecting a torque by a torque detection means for producing a contact pressure of the conical disks with an endless torque-transmitting means that is proportional to the torque being transmitted.

12. A method in accordance with claim 11, wherein the controller makes a judgment as to whether the change in the rotational speed ratio is triggered by the change in the transmission ratio, by means of a torque that is detected by the torque detection means.

13. A method in accordance with claim 11, including the step of transmitting to the controller a torque signal from the torque detection means, wherein the torque signal is one of electrical form and hydraulic form.

14. A method in accordance with claim 11, wherein the controller carries out the following steps when the change in rotational speed is detected:
　a) determining the torques of active shafts of the power-branched transmission, using the current transmission ratio of the transmission and inertial masses of the shafts;
　b) determining the torque conducted through the variable speed drive unit;
　c) determining the necessary axial force of the axial force producing means from the torque conducted through the variable speed drive unit;
　d) determining the torque conducted through the torque detection means;
　e) determining the produced axial forces from the torque contribution determined in (d);
　f) calculating the difference between the necessary and the produced axial forces; and
　g) ordering a change in axial force such that the difference in (f) decreases.

15. A method in accordance with claim 14, wherein the transmission includes a plurality of rotational speed sensors, and a determination is carried out in at least one of the steps a)

through e) based upon rotational speed signals from the rotational speed sensors to determines the transmission ratio of the variable speed drive unit.

16. A method in accordance with claim 14, wherein in at least one of the steps a) through e) the transmission ratio of the overall transmission is conveyed to the controller.

17. A method in accordance with claim 14, wherein in at least one of the steps a) through e) a shift state of the at least two control clutches is conveyed to the controller.

18. A method in accordance with claim 14. wherein a rotational speed sensor is provided for sensing rotational speeds of the vehicle wheels, and wherein in at least one of the steps a) through e) a change in the rotational speeds of the vehicle wheels detected by the rotational speed sensors for the vehicle wheels is conveyed to the controller.

19. A transmission in accordance with claims 2, wherein the torque detection means is a hydromechanical torque sensor that produces a pressure on a conical disk that is proportional to the torque being transmitted.

* * * * *